US007911631B2

(12) United States Patent
Aoki et al.

(10) Patent No.: US 7,911,631 B2
(45) Date of Patent: Mar. 22, 2011

(54) COMMUNICATION SYSTEM

(75) Inventors: Kazuma Aoki, Kasugai (JP); Yuji Sato, Nagoya (JP); Masatoshi Kokubo, Aichi-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 2161 days.

(21) Appl. No.: 10/759,007

(22) Filed: Jan. 20, 2004

(65) Prior Publication Data

US 2004/0145778 A1 Jul. 29, 2004

(30) Foreign Application Priority Data

Jan. 21, 2003 (JP) .................................. 2003-012703

(51) Int. Cl.
*G06F 3/12* (2006.01)
*G06K 9/20* (2006.01)

(52) U.S. Cl. ...... 358/1.15; 358/1.18; 358/474; 715/221; 715/224

(58) Field of Classification Search ................ 358/1.15, 358/1.148, 1.18, 474; 715/221, 222, 223, 715/224, 225, 226
See application file for complete search history.

(56) References Cited

U.S. PATENT DOCUMENTS

| | | | | | |
|---|---|---|---|---|---|
| 5,060,980 | A | * | 10/1991 | Johnson et al. | 283/70 |
| 5,781,914 | A | * | 7/1998 | Stork et al. | 715/234 |
| 6,023,714 | A | * | 2/2000 | Hill et al. | 715/235 |
| 6,537,324 | B1 | * | 3/2003 | Tabata et al. | 715/205 |
| 6,681,045 | B1 | * | 1/2004 | Lapstun et al. | 382/187 |
| 6,813,039 | B1 | * | 11/2004 | Silverbrook et al. | 358/1.18 |
| 7,289,685 | B1 | * | 10/2007 | Wolff et al. | 382/317 |
| 2002/0194219 | A1 | * | 12/2002 | Bradley et al. | 707/506 |
| 2003/0088828 | A1 | * | 5/2003 | Ackaret | 715/505 |
| 2003/0093378 | A1 | * | 5/2003 | Silverbrook et al. | 705/40 |
| 2004/0039757 | A1 | * | 2/2004 | McClure | 707/201 |

FOREIGN PATENT DOCUMENTS

| | | |
|---|---|---|
| JP | A-10-283313 | 10/1998 |
| JP | A 10-283313 | 10/1998 |
| JP | A-2000-341492 | 12/2000 |

OTHER PUBLICATIONS

Turlington, Shannon. Sams Teach Yourself Netscape Communicator 4.5 in 24 Hours. Indianapolis, Ind: Sams Publishing. 1998. NetLibrary.*

* cited by examiner

*Primary Examiner* — Twyler L Haskins
*Assistant Examiner* — Kent Yip

(57) ABSTRACT

A communication system includes a printing unit, an image scanning unit, an accessing system connectable to a web page. The printing unit prints out the web page on a first recording medium. When the web page includes an input field and the data input in the input field is to be transmitted to a predetermined destination, the printing unit prints out an image having a fill-in area to be filled in by the user, and a destination area indicating the destination, on a second recording medium. The communication system includes a scan controller that controls the scanning unit to scan the second recording medium to capture an image thereof, a recognition system that recognizes contents written in the fill-in area and the destination area based on the scanned image, and a data transmitting system that transmits contents extracted from the fill-in area to the destination extracted from the destination area.

20 Claims, 9 Drawing Sheets

FIG.3A

Registration

S1 — Please, register your data to join us

S2 — name: [        ]  S2

Male: ○   Female: ○

S1 — address: [              ]

select type: [ type1  ▽ ]

B — [send]

```
<html>
<body>
<H1>Registration</H1>
<p>
Please, register your data to join us.<br>
<br>
<form action="http://xxx.com/cgi/prog_a" method="get">
name:<input type="text" name="name" size="20"><br>
Male:<input type="radio" name="sex" value="male">
Female:<input type=" name="sex" value="female"><br>
address:<input type="text" name="address" size="40"><br>
select type:<select name="type">
          <option value="1">type1
          <option value="2">type2
          <option value="3">type3
</select>
<br>
<input type="submit" value="send">
</form>
</p>
</body>
</html>
```

FIG. 4

```
                    INPUT FORM No. 1         A1

—  | Method  | get                          |  —   A21
   —  | URL     | http://xxx.com/cgi/prog_a    |  —   A22    A2
   —  | Expires | 2002/12/01 Sun 23:00:00      |  —   A23
   —  | Modify  | 2002/11/24 Sun 10:00:00      |  —   A24
   —  | ORG     | http://xxx.com/regist/form.html | — A25
```

A31a, A32b, A32b, A31b, A32c, A32c, A31b

- A32a ■ name [                ] ■ A31, A32
- A32a ● sex  [□ male       ]   ● A32
- A31a ● sex  [□ female     ]   ● A31     A3
- A33a ■ address [            ] ■ A33
- A33a ▲ type [□ Type1 | 1 ]   ▲ A33
- A33a ▲ type [□ Type2 | 2 ]   ▲ A33
-      ▲ type [□ Type3 | 3 ]   ▲ A33

| Method | get |
|---|---|
| URL | http://xxx.com/cgi/prog_a |
| Expires | 2002/12/01 Sun 23:00:00 |
| Modify | 2002/11/24 Sun 10:00:00 |
| ORG | http://xxx.com/regist/form.html |

FIG.6B

| name | EEEE FFFF |
|---|---|
| sex | male |
| address | 123 GGG HHH III Japan |
| type | 1 |

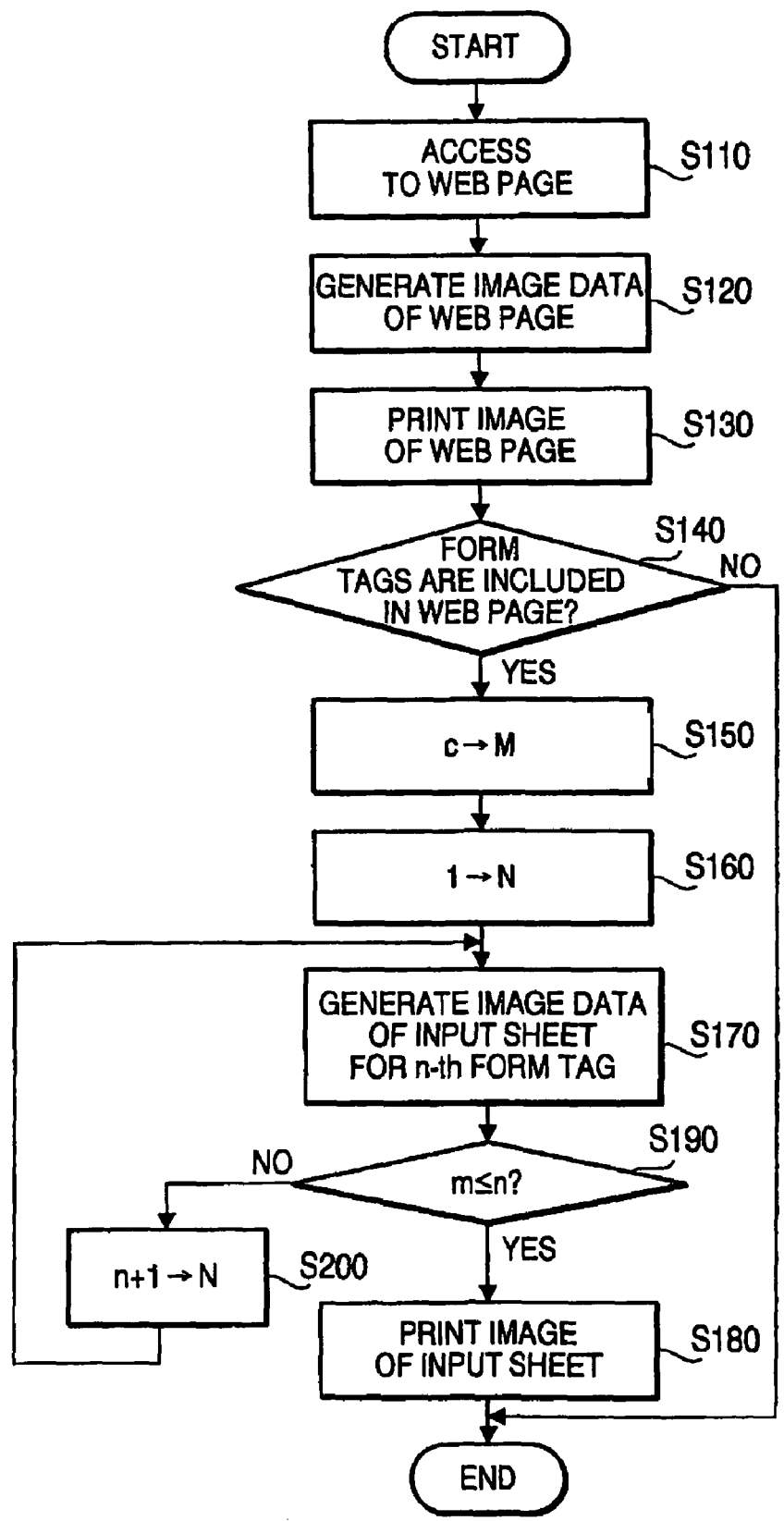

FIG. 9

| | INPUT FORM No. 1 | |
|---|---|---|
| Method | get | |
| URL | http://xxx.com/cgi/prog_a | |
| Expires | 2002/12/01 Sun 23:00:00 | |
| Modify | 2002/11/24 Sun 10:00:00 | |
| ORG | http://xxx.com/regist/form.html | |

| name | | |
|---|---|---|
| sex | ☐ | male |
| sex | ☐ | female |
| address | | |
| type | ☐ Type1 | 1 |
| type | ☐ Type2 | 2 |
| type | ☐ Type3 | 3 |

COMMUNICATION SYSTEM

BACKGROUND OF THE INVENTION

The present invention relates to a communication terminal that prints out a web page which is accessible through a network to enable a user to view the web page. The present invention also relates to a communication system employing such a communication terminal, and a communication program which can be executed in such devices.

Recently, a communication terminal that has a function of printing out a web page, which is accessible through a network, on a recording medium instead of displaying the web page on a display device has been developed. The function will be referred to as a web print function hereinafter. As example of such a communication terminal, a facsimile machine, a multi-function peripheral having a printing function and a network printer are known.

According to the web print function, in the conventional communication terminal, an image of the web page is printed out on the recording sheet. Therefore, there are cases where what can be done in a web browser cannot be done when the web print function is used. Recently, various techniques have been suggested to realize functions that have not been achieved using the web print function.

For example, generally a web page, which is accessible through a network, includes hyperlinks. When a hyperlink displayed on a screen of a personal computer is clicked using a mouse, the computer is controlled to access another web page indicated by the hyperlink. When such a web page is printed out on a recording sheet, however, it is impossible to select a hyperlink. Thus, it is impossible to access another web page indicated by the hyperlink.

In order to solve the problem, a technology as described below has been suggested.

Firstly, an accessed web page (i.e., a web page which the user accesses by operating a communication terminal) is printed out on a recording medium together with access data indicative of location information (e.g., URL) of the accessed web page. Then, the user draws a mark on the recording sheet at a position where an object corresponding to the hyperlink is printed. The recording sheet carrying the image of the web page and the mark drawn by the user is then scanned. Based on the access data as printed and the location of the mark drawn by the user, the communication terminal accesses the web page corresponding to the location information, and then, identifies access data indicative of the destination from the hyperlink corresponding to the object (i.e., hyperlink) located at the same position of the mark drawn by the user. Then, the communication terminal accesses the designated web page, and prints out the image of the web page corresponding to the hyperlink. It should be noted that an example of such a technology is disclosed in Japanese Patent Provisional Publication No. HEI 10-283313.

According to the above-described technology, the user can use the function of the hyperlink even when the web page is a printed image.

A web page may include input fields where the user is required to input some information, and typically, the input information is transmitted to a predetermined destination. When such a web page is printed out on a recording sheet, it is impossible to input information in the input fields. Further, it is impossible to transmit information to the predetermined destination. No technology for solving the above problem has been suggested, and a technology that enables the above function has been desired recently.

SUMMARY OF THE INVENTION

The present invention is advantageous in that an improved communication terminal device is provided. The improved communication terminal is configured to print out a web page on a recording medium instead of displaying the same using a browser, and enables a user to input information and to transmit the input information to a predetermined destination.

According to an aspect of the invention, there is provided a communication system, which is provided with a printing unit that is controlled to print an image on a recording medium, a scanning unit that is controlled to scan an image, an accessing system that connects with a web page though a network in response to an operation of a user, a first print controller that controls the printing unit to print the web page accessed by the accessing system on a first recording medium; a second print controller that operates such that, when the web page accessed using the accessing system includes an input field in which data is to be input by the user and the data input in the input field being to be transmitted to a predetermined destination, the second print controller controls the printing unit to print an image having at least a fill-in area corresponding to the input field, the fill-in area being to be filled in by the user, and a destination area indicating the destination defined by the web page on a second recording medium. The communication system further includes a scan controller that controls the scanning unit to scan the second recording medium having been filled in by the user to capture an image thereof, a recognition system that recognizes contents written in the fill-in area and the destination area based on the image of the second recording medium scanned by the scanning unit under control of the scan controller, and a data transmitting system that transmits contents written in the fill-in area and recognized by the recognition system to the destination printed in the destination area and recognized by the recognition system.

Optionally, the second print controller is configured to examine whether the web page accessed with the accessing system includes term data representing an effective term of the web page, the second print controller controls the printing unit to print an image having a term area related to the term data as well as the fill-in area and the destination area on the second recording medium. Further, the recognition system is configured to recognize contents printed in the fill-in area, the destination area and the term area of the image scanned by the scanning unit, and the communication system further comprises a term examining system that determines whether a current date/time is later than a term that is printed in the term area of the second recording medium and recognized by the recognition system. Furthermore, the data transmitting system is configured to transmits the contents written in the fill-in area to the destination indicated by the contents in the destination area only when the term examining system determines that the current date/time is on or before the term extracted from the term area of the second recording medium.

In this case, the communication system may further be provided a notifying system that notifies a user of the communication system that the current date/time is later than the effective term of the web page when the term examining system determines that the current date/time is later than the term extracted from the term area of the second recording medium.

Optionally or alternatively, the second print controller may be configured to examine whether the web page accessed with the accessing system includes a modified time data representative of a date/time when the contents of the web page were lastly modified, the second print controller controls the printing unit to print an image having a last-modified time area representing the last modified date/time of the web page and an access data area having access data that was referred to when the accessing system accessed the web page as well as the fill-in area and the destination area on the second recording medium. Further, the recognition system may be configured to recognize contents printed in the fill-in area, the destination area, the last-modified time area and the access data area of the image scanned by the scanning unit. The communication system may further include a modified date/time obtaining system that obtains the last-modified date/time from the web page with reference to the data in the access data area, and a modified date/time examining system that examines whether the last-modified date/time obtained by the modified date/time obtaining system coincides with a date/time that is printed in the last-modified date/time area and recognized by the recognition system. In this configuration, data transmitting system may transmit the contents written in the fill-in area to the destination indicated by the contents in the destination area only when the modified date/time examining system determines that the last-modified date/time obtained by the modified date/time obtaining system coincides with a date/time printed in the last-modified date/time area and recognized by the recognition system.

In this case, the communication system may include a notifying system that notifies a user of the communication system that the last-modified date/time obtained by the modified date/time obtaining system does not coincide with a date/time that is extracted from the last-modified date/time area of the second recording medium when the modified date/time examining system determines that the last-modified date/time obtained by the modified date/time obtaining system does not coincide with a date/time printed in the last-modified date/time area of the second recording medium and recognized by the recognition system.

Optionally, when the web page accessed with the accessing system includes a plurality of groups of input fields, the input fields falling within a same group having a same destination, the input fields falling within different groups having different destinations, the second print controller may control the printing unit to print an image having at least the fill-in area and the destination area on different second recording mediums for different groups of input fields.

Alternatively, when the web page accessed with the accessing system includes a plurality of groups of input fields, the input fields falling within a same group having a same destination, the input fields falling within different groups having different destinations, the second print controller may control the printing unit to print an image having at least the fill-in area and the destination area on the same second recording medium regardless whether the plurality of input fields fall within the different groups.

According to another aspect of the invention, there is provided a communication terminal, which is provided with a printing unit that is controlled to print an image on a recording medium, an accessing system that connects with a web page though a network in response to an operation of a user, a first print controller that controls the printing unit to print the web page accessed by the accessing system on a first recording medium, and a second print controller that operates such that, when the web page accessed using the accessing system includes an input field in which data is to be input by the user and the data input in the input field being to be transmitted to a predetermined destination, the second print controller controls the printing unit to print an image having at least a fill-in area corresponding to the input field, the fill-in area being to be filled in by the user, and a destination area indicating the destination defined by the web page on a second recording medium.

Optionally, the communication terminal may include a scanning unit that is controlled to scan an image, a scan controller that controls the scanning unit to scan the second recording medium having been filled in by the user to capture an image thereof, a recognition system that recognizes contents written in the fill-in area and the destination area based on the image of the second recording medium scanned by the scanning unit under control of the scan controller, and a data transmitting system that transmits contents written in the fill-in area and recognized by the recognition system to the destination printed in the destination area and recognized by the recognition system.

According to a further aspect of the invention, there is provided a communication terminal, which is provided with a scanning unit that is controlled to scan an image, an accessing system that connects with a web page, a scan controller that controls the scanning unit to scan a recording medium on which an image having at least a fill-in area in which the user writes a character string and a destination area indicating a destination to which data corresponding to the character string filled in the fill-in area is transmitted, a recognition system that recognizes contents written in the fill-in area and the destination area based on the image of the recording medium scanned by the scanning unit under control of the scan controller, and a data transmitting system that transmits contents written in the fill-in area and recognized by the recognition system to the destination printed in the destination area and recognized by the recognition system.

According to another aspect of the invention, there is provided a computer program product that defines a procedure to be executed by a computer for communicating using a web page. The computer program product includes the instructions of accessing a web page though a network in response to an operation of a user, printing the web page as accessed on a first recording medium, printing an image having at least a fill-in area to be filled in by the user and a destination area indicating a destination to which data corresponding to the fill-in area is to be transmitted on a second recording medium when the web page includes an input field in which data is to be input by the user and the data input in the input field being to be transmitted to a predetermined destination, the fill-in area corresponding to the input field, the predetermined destination being represented in the destination area, a scanning the second recording medium having been filled in by the user to capture an image thereof, a recognizing contents written in the fill-in area and the predetermined destination indicated in the destination area based on the image of the second recording medium, and transmitting contents written in the fill-in area and recognized in the step of recognizing to the predetermined destination recognized in the step of recognizing.

According to a further aspect of the invention, there is provided a computer program product defining a procedure to be executed by a computer for printing data related to a web page, which includes the instructions of accessing a web page though a network in response to an operation of a user, printing an image of the web page as accessed on a first recording medium, and printing an image having at least a fill-in area and a destination area when the web page includes an input field in which data is to be input by the user and the data input in the input field being to be transmitted to a predetermined destination, the fill-in area corresponding to the input field, the fill-in area being to be filled in by the user, the destination area indicating the destination defined by the web page.

According to a furthermore aspect of the invention, there is provided a computer program product defining a procedure to be executed by a computer for communicating, which is provided with the instructions of scanning a recording medium on which an image having at least a fill-in area in which the user writes a character string and a destination area indicating a destination to which data corresponding to the character string filled in the fill-in area is transmitted, recognizing contents written in the fill-in area and the destination area based on the image of the recording medium, and transmitting contents written in the fill-in area and recognized in the step of recognizing to the destination indicated in the destination area and recognized in the step of recognizing.

According to a further aspect of the invention, there is provided a method of communicating using a web page, which includes the steps of accessing a web page though a network in response to an operation of a user, printing the web page as accessed on a first recording medium, printing an image having at least a fill-in area to be filled in by the user and a destination area indicating a destination to which data corresponding to the fill-in area is to be transmitted on a second recording medium when the web page includes an input field in which data is to be input by the user and the data input in the input field being to be transmitted to a predetermined destination, the fill-in area corresponding to the input field, the predetermined destination being represented in the destination area, a scanning the second recording medium having been filled in by the user to capture an image thereof;

a recognizing contents written in the fill-in area and the predetermined destination indicated in the destination area based on the image of the second recording medium, and transmitting contents written in the fill-in area and recognized in the step of recognizing to the predetermined destination recognized in the step of recognizing.

According to another aspect of the invention, there is provided a method of printing data related to a web page, which includes the step of accessing a web page though a network in response to an operation of a user, printing an image of the web page as accessed on a first recording medium, and printing an image having at least a fill-in area and a destination area when the web page includes an input field in which data is to be input by the user and the data input in the input field being to be transmitted to a predetermined destination, the fill-in area corresponding to the input field, the fill-in area being to be filled in by the user, the destination area indicating the destination defined by the web page.

According to a further aspect of the invention, there is provided a method of communicating, which includes the steps of scanning a recording medium on which an image having at least a fill-in area in which the user writes a character string and a destination area indicating a destination to which data corresponding to the character string filled in the fill-in area is transmitted, recognizing contents written in the fill-in area and the destination area based on the image of the recording medium, and transmitting contents written in the fill-in area and recognized in the step of recognizing to the destination indicated in the destination area and recognized in the step of recognizing.

BRIEF DESCRIPTION OF THE ACCOMPANYING DRAWINGS

FIG. 3A is a screen image when a web page is observed using a browser;

FIG. 3B shows an HTML representation of the web page shown in FIG. 3A;

FIG. 4 shows an example of an input form;

FIG. 6A shows a data structure of a parameter table;

FIG. 6B shows a data structure of a fill-in table;

FIG. 7 is a flowchart illustrating a web print procedure according to a second embodiment;

FIG. 9 shows another example of an input form according to second embodiment.

DETAILED DESCRIPTION OF THE EMBODIMENTS

Hereinafter, referring to the accompanying drawings, multi-functional peripherals according to first and second embodiments will be described.

Figure 1:
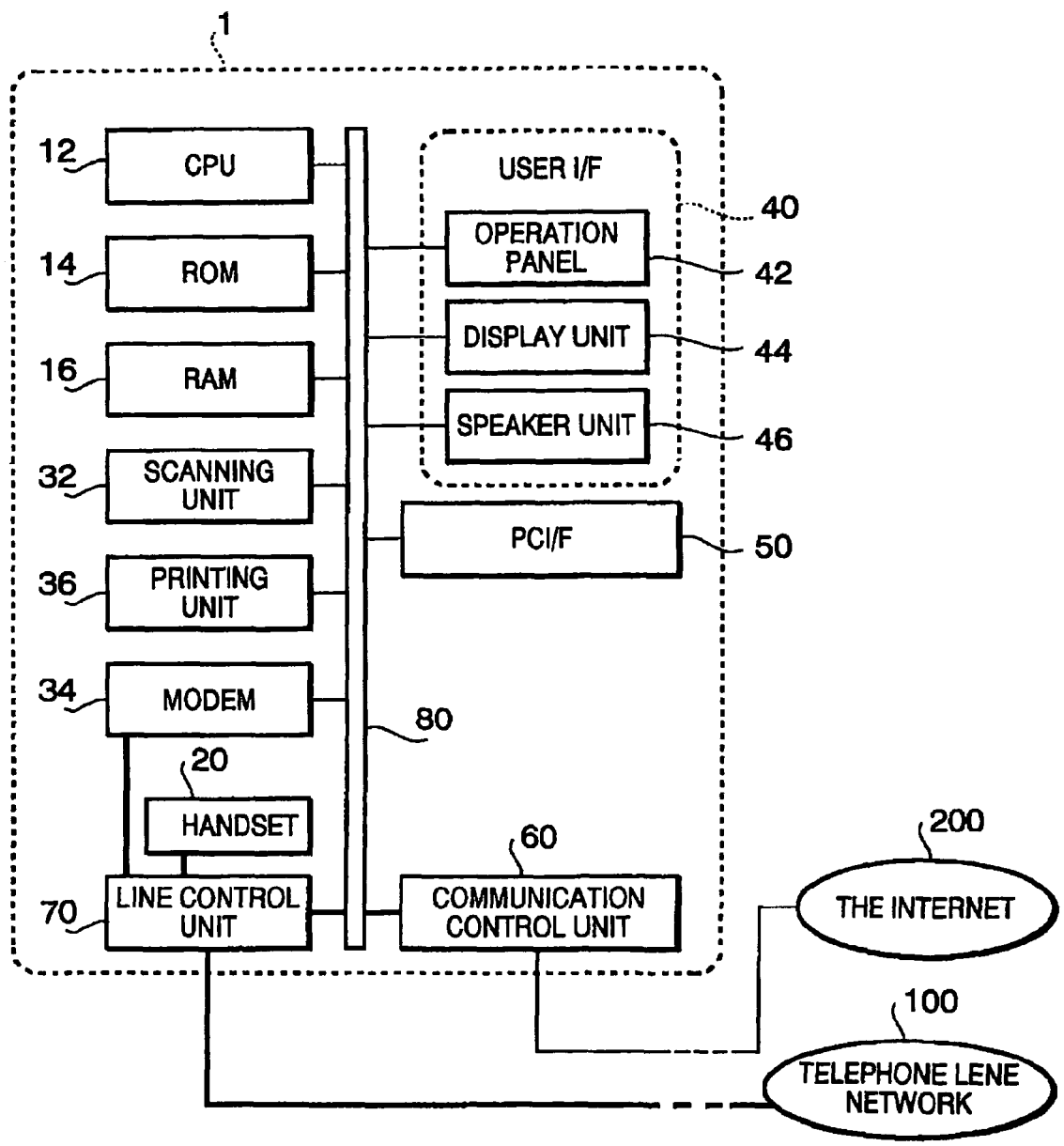
FIG. 1 is a block diagram showing a control system of a multi-function peripheral according to a first embodiment of the invention.

FIG. 1 shows a control system of a multi-functional peripheral (hereinafter, referred to as MFP) 1 according to a first embodiment of the invention. The MFP 1 has a function of executing audio communication through a public telephone line 100, a function of transmitting image data through the public telephone line 100, and a function of printing a web page, which is accessible through the Internet 200, on a recording sheet. The third function will be referred to as a web print function hereinafter.

The MFP 1 has, as shown in FIG. 1, a CPU 12, a ROM 14, a RAM 16, a handset 20, a scanner unit 32, a modem 34, a printer unit 36, a user interface unit (hereinafter referred to as user I/F) 40, a PC interface unit (hereinafter referred to as a PC I/F) 50, a communication control unit 60, and a line control unit 70, which are interconnected through a bus 80.

The CPU 12 controls an entire operation of the MFP1 by executing various procedures, which are stored in the ROM 14 as programs, with storing results of procedures in the RAM 16 and transmitting commands to respective units of the MFP 1 through the bus 80.

In order to access web pages, the CPU 12 executes communication software stored in the ROM 14. The communication software controls the communication control unit 60 to transmit an HTTP request to a server connected to the Internet 200 for a transmission of web page based on the HTTP (Hyper Text Transfer Protocol), and receives, with the communication control unit 60, the web page transmitted from the server as an HTTP reply.

The handset 20 is transmitter/receiver connected to, and is picked up from the MFP 1 when in use. The scanner unit 32 functions, in response to a command from the CPU 12, to scan an image on an original placed on a predetermined scanning position and to generate image data of the scanned image.

The modem 34 functions, under control of the CPU 12, to modify image data generated by the scanner unit 32 to generate image signal that can be transmitted through the telephone line 100, and generates image data by demodulating the image signal input from the telephone line 100 via the line control unit 70.

The printer unit 36 functions, under control of the CPU 12, to print out images (characters/letters) on the recording sheet which is placed at a predetermined print position.

Figure 5:
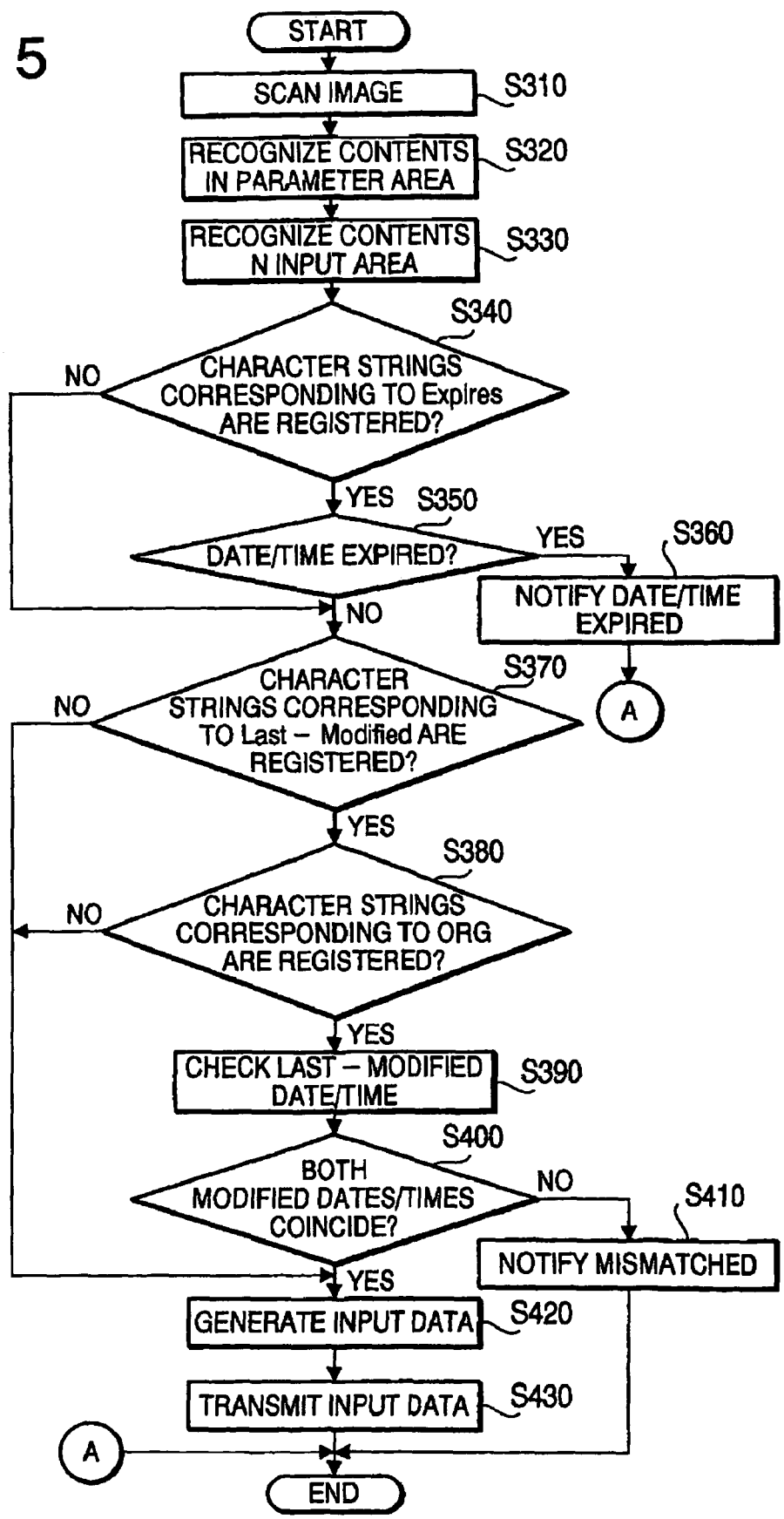
FIG. 5 is a flowchart illustrating a web scan procedure according to a first embodiment of the invention.

The user I/F 40 includes an operation panel 42 provided with a plurality of keys and switches, a display panel 44 that displays various information on its screen, a speaker unit 46 having speakers and a driving circuit for the speakers. It should be noted that the operation panel 42 includes a web print key for starting print out of a web page in a web print procedure described later (FIG. 2), and a scan key for starting scanning of an image using the scanner unit 32 in the web scan procedure (FIG. 5).

The PC I/F 50 is an interface for connecting the MFP 1 with another computer system through a communication cable. With the PC I/F 50, it becomes possible to execute data communication between the MFP 1 and the external computer system. The communication control unit 60 functions, under control of the CPU 12, to receive packet data from an external device and/or transmitting packet data to an external device.

The line control unit 70 transmits/receives various signals through the telephone network 100. The line control unit 70 sets transmission paths through which the signals are transmitted to and/or received from the telephone line 100. The transmission paths are set such that, when the handset 20 is picked up from the MFP 1 (i.e., an off-hook operation is performed by the user), the path directed from the line control unit 70 to the handset 20 is set to the transmission path, through which the audio signal can be transmitted. The thus set transmission path is released when the handset 20 is returned to the MFP 1 (i.e., an on-hook operation is performed). When the handset 20 is in the on-hook condition, the audio signal is not transmitted through the path.

When an operation for transmitting an image is performed using the operation panel 42 (e.g., a facsimile transmission is performed), or when an image signal is received, the path directed to the modem 34 is set as the transmission path, through which the image signal can be transmitted. The thus set transmission path is released when the transmission of the image signal through the modem 34 has been finished or when the input of the image signal through the telephone line 100 has been finished. After the transmission path is released, no image signal is transmitted therethrough.

Although not described in detail, in a part of the transmission path from the communication control unit 60 to the Internet 200 (i.e., a zone from the user to a telephone exchange station), the telephone line connecting the line connection unit 70 to the public telephone network 100 is used. In this zone, with use of an ADSL (asymmetric digital subscriber line) technology, a signal transmitted through the public telephone network 100 and the packet data transmitted to through the Internet 200 are overlapped.

Hereinafter, the web print procedure, which is executed by the CPU 12 of the MFP 1, will be described with reference to FIG. 2.

The web print procedure is started when a user operates the operation panel 42 to input a URL (Uniform Resource Locator) of a target web page, and depress a web print key.

In S110, the CPU 12 accesses the web page designated by the URL input through the operation panel 42. Specifically, the CPU 12 transmits a request for a web page designated by the URL, and receives data of a web page which is transmitted from the server as a response to the request.

When the CPU 12 accesses the web page in S110, data transmission according to the HTTP is executed between the MFP 1 and the server. When the data (HTTP header) transmitted from the server includes an "Expires" header field (e.g., [Expires: Sun, 1 Dec. 2002 16:00:00 GMT]) and a "Last-Modified" header field (e.g., [Last-Modified: Sun, 24 Nov. 2002 01:00:00 GMT]), the CPU 12 stores the contents of the header fields in the RAM 16.

It should be noted that "Expires" represents an expiration term of information contents provided by the web page (i.e., the effective term of the web page), and after expiration of the date/time indicated by the "Expires" header field, the information contents (e.g., contents to be input by the user and/or destination to which the input data is transmitted) may be changed. The "Last-Modified" represents the latest date/time when the contents of the web page are updated. It should be noted that "date/time" in this specification means "date" of "date and time". For example, the expiration of term may be determined based only on the date, or based on the date and time.

Next, based on the image of the web page accessed in S110, image data indicative of the web page is generated in S120.

In S130, the image of the web page generated in S120 is printed out using the printer unit 36 on a recording sheet. FIG. 3A shows an example of the web page as printed out.

In S140, the CPU 12 determines whether the web page accessed in S110 includes form tags in its HTML (Hyper Text Markup Language) script. Specifically, in S140, it is examined whether the form tags (i.e., <form>, </form>) as shown in FIG. 3B are included in the HTML script.

In the web page including the form tags as above, an input tag (i.e., <input . . . >) and a selection tag (i.e., <select . . . >) included in the form tags are displayed, when viewed using a web browser, as input or selection controls as shown in FIG. 3B. The user can input necessary information in the input boxes (fields) when the web browser is used. Typically, the input boxes include an input box S1 for inputting a text when the input tag is assigned with type="text" attribute or a type="password" attribute, an input box S2 for checking when the input tag is assigned with type="radio" attribute or type="checkbox" attribute, and an input box S3 for selection (e.g., a pull-down menu) when the input tag is assigned with type="selection" attribute.

The form tags also include an input tag having an type="submit" attribute, which is displayed as a submission button (send button) B when displayed using the web browser. When the user select the submission button B, the input data representing the text input in the input boxes (S1, S2 and S3) is transmitted to a destination assigned to an action attribute (i.e., action="BBBB": "BBBB" is a URL or an e-mail address) in the form with values set to a name attribute (i.e., name="AAAA"; "AAAA" is an arbitral character string) of the input tag or selection tag being added to the input data.

As above, when form tags are included in the web page, with use of the value assigned to the action attribute, a destination to which the input data is transmitted can be designated.

It should be noted that the contents input in the input boxes will be a text as is input when the input box is for a text input (S1), a value assigned to the value attribute (e.g., value="CCCC"; "CCCC" is an arbitrary character string) of the input tag when the input box is for the checking, and a value assigned to the value attribute in the selected item when the input box is for selection (S3).

In S140, when the web page is one including the form tags (S140: YES), the number c of form tags included in the page is counted, and a variable M is set to the counted number c (i.e., c is input in the variable M) in S150. In the following description, "m" represents the value of the variable M.

In S160, a variable N is initialized. Specifically, the variable N is set to 1 (one).

Next, based on the form tags included in the web page that is accessed in S110, an image data representing an image of an input sheet is generated (S170). Specifically, in S170, based on an n-th form tag counted from the top of the HTML script, an image data of the input sheet is generated. FIG. 4 shows an example of the input sheet as generated in S170. As shown in FIG. 4, the input sheet has a number area A1 where a form number is indicated, a parameter area A2 where parameters necessary for transmitting the input data are indicated, an input area A3 where the user is required to write contents to be input in the input boxes S is indicated.

Each area will be described in detail below. The input sheet includes:

1. Number Area A1: a value "n" of the variable N is indicated.
2. Parameter area A2.
    A21: method area—where a character string "method" and a value ("DDDD": GET or POST) of a method attribute (method="DDDD") of an n-th form tag are indicated as arranged horizontally (a right-and-left direction in FIG. 4);
    A22: destination area A22—a character string "URL" and a value ("BBBB"; URL or e-mail address) assigned to the action attribute (action="BBBB") in the n-th form tag are indicated as arranged horizontally (a right-and-left direction in FIG. 4);
    A23: an effective term area A23—when the contents of the "Expires" header field is stored in the RAM 16 in S110, the character string "Expires" and the contents of the Expires header field area indicated as arranged horizontally (a right-and-left direction in FIG. 4); and
    A24: a modified date area A24—when the contents of the "Last-Modified" header field is stored in the RAM 16 in S110, the character string "Last-Modified" and the contents of the "Last-Modified" header field are indicated as arranged horizontally (in a right-and-left direction in FIG. 4);
    A25: an address area—a character string "ORG" and an URL of the web page accessed in S110 are indicated as arranged horizontally (in the right-and-left direction in FIG. 4);
3. Input area A3 which includes
    A31: a text area A31—an area created when an n-th form tag includes an input box S1 for inputting a text. The area A31 has a name value A31a which is a value assigned to a name attribute in the input tag of the input box S1; and a text input area A31b where the user is required to input contents, which are arranged horizontally (i.e., in the right-and-left direction in FIG. 4);
    A32: a check area A32—an area created when the n-th form tag includes an input box S2 for checking. The area A32 has a name value A32a which is a value set to the name attribute in the input item of the input box S2; a check area A32b where the user is required to check; and a option value A32c which is a value set to a value attribute of the input item of the input box S2, which are arranged horizontally (i.e., in the right-and-left direction in FIG. 4);
    A33: a selection area A32—an area created when the n-th form tag includes the input box S3 for selection. The selection area A33 includes a name value area A33b which is a value assigned to the name attribute of the selection tag of the input box S3; a character string A33c written immediately after an option tag (<option>) between the selection tags (from <select . . . > to </select>); and an option value A33d which is a value assigned to a value attribute of the option tag, which are arranged horizontally (i.e., in the right-and-left direction in FIG. 4).

It should be noted that, in the parameter area A2 and input area A3, predetermined marks are indicated. The predetermined marks indicate locations of respective contents, and are used in a web scanning procedure (which will be described later with reference to FIG. 5). In the embodiment, a mark "=" is used for the parameter area A2, a mark "■" is used for the text area A31, a mark " " is used for the check area A32, and a mark "▲" are used for the selection area A33 of the input area A3.

According to the embodiment, in the effective term area A23, the modified date/time A24 of the parameter area A2, the contents of the "Expires" and "Last-Modified" header fields represented by GMT (Greenwich Mean Time) are converted into local times (for example, GMT+9 in Japan) and are indicated.

Next, an image of the web page represented by image data generated in S170 is printed out (S180). With this step, an input sheet as indicated in FIG. 4 is printed out. In the first embodiment, as the text area A31 of the input area A3, a text area for inputting a name (a value of a name attribute A31a is "name") and a text area for inputting an address (a value of a name attribute A31a is "address") are generated. According to the embodiment, further to the above, as the check area A32, a check area for checking sexuality (a value of the name attribute A32a is "sex") is generated, and as the selection area A33, a type selecting area (a value of the name attribute A33a is "type") is formed.

After the input sheet as shown in FIG. 4 is printed out in S180, the user writes characters/letters in the text fill-in areas A31b of each text area A31, selectively draws check marks in one or more check boxes A32b of a plurality of check areas A32, and selectively draws check mark in one of a plurality of check boxes A33b of the check areas A33. As an example, it is assumed that the user writes "EEEE FFFF" and "123 GGG HHH III Japan" as the name and address, and checks "male" as his gender, and checks the type I.

In S190, the CPU 12 checks whether the value n of the variable N is equal to or greater than the value m of the variable M. When the value n of the variable N is equal to or greater than the value m of the variable M (S190: YES), a procedure after S170 has been executed for all the form tags of the web page accessed in S110.

When the value n is less than the value m (S190: NO), the value n of the variable N is incremented by one (S200) and control returns to S170.

After the steps from S170 to S200 are repeated, and when the value n of the variable N becomes equal to the value m of the variable M or greater (S190: YES), or when the control determines that the web page does not include the form tags (S140: NO), the web print procedure is stopped.

Next, the web scan procedure executed by the CPU 12 of the MFP 1 will be described with reference to FIG. 5. The web scan procedure is started when the input sheet printed out in the web print procedure (FIG. 2) is placed at a predetermined scanning position and a scan key of the operation panel 42 is depressed.

In the web scan procedure, firstly, the image of the input sheet (see FIG. 4) is scanned (S310). In this step, the CPU 12 controls the scanning unit 32 to scan an entire image on the input sheet, and the scanner unit 32 scans the image of the input sheet as instructed by the CPU 12.

In S320, the contents of the parameter area A2 are recognized based on the image scanned in S310. That is, in step S320, the CPU 12 controls the scanning unit 32 to perform an OCR (Optical Character Recognition) to recognize written characters at portions of the scanned image, each portion being indicated by a pair of marks "=", and the recognition results are stored in a data table (which will be referred to as a parameter table) in the RAM 16. The data structure of the parameter table is shown in FIG. 6A.

For example, firstly, a character string "Method" printed in the method area A21 is registered with the parameter table in association with a character string "GET" or "POST" that represents a method attribute. The, the character string "URL" printed in the transmission destination area A22 is registered in the parameter table in association with a value set in the action attribute (i.e., a URL or an e-mail address). Next, the character string "Expires" indicated in the effective term area A23 is registered with the parameter table in association with a character string representing the contents of the "Expires" header field (i.e., 2002 Dec. 1, Sun 23:00:00). Then, the character string "Last-Modified" is registered with the parameter table in association with the character string indicative of the contents of the "Last-Modified" header field (i.e., 2002 Nov. 24 Sun 10:00:00). Finally, the character string "ORG" printed in the address area A25 is registered with the parameter table in association with the character string indicating the URL of the web page (i.e., http//xxx.com/regit/form.html). It should be noted that areas in which no character strings are printed will not be registered with the parameter table.

Next, from the images read in S310, the contents of the input area A3 are recognized (S330). In this step, the OCR is performed to recognize the contents at the positions identified by the marks "■", "●" and "▲", and the recognition results are stored in a data table (hereinafter, referred to as an input table), which is stored in the RAM 16. The data structure of the input table is shown in FIG. 6B.

Regarding the text area A31, the character string indicating the value of the name attribute A31a is regarded as a name of the variable, the character string written in the text fill-in area A31b is regarded as the content of the variable, and the value of the name attribute and contents of the variable are registered in relation to each other.

Regarding the check area A32, the character string representing the value of the name attribute A32a is regarded as the name of the variable, the character string indicative of an option value A32c corresponding to (arranged next to) the check area A32b in which a check mark is drawn is regarded as the contents of the variable, and the name and contents of the variable are registered in relation to each other.

Regarding the selection area A33, the character string indicative of the value of the name value attribute A33a is regarded as the variable name, and the character string indicative of the option value A33d corresponding to (i.e., arranged next to) the check area A33b in which the check mark is drawn is regarded as the contents of the variable, and the variable name and the contents of the variable are registered in relation to each other.

Next, in S340, the CPU 12 examines whether the character string corresponding to the character string "Expires" is registered with the parameter table that is generated in S320.

When the character string corresponding to the character string "Expires" is registered with the parameter table (S340: YES), the CPU 12 examines whether the current date/time is later than the date/time represented by the character string (which corresponds to the character string "Expires") registered with the parameter table (S350).

When the current date/time is later than the date/time represented by the character string registered with the parameter table (S350: YES), the CPU 12 notifies the user that the date/time registered with the parameter table has expired (S360), and finishes the web scan procedure. In S360, the CPU 12 displays a message indicating that the current time and date is later than the date/time indicated by the character string registered with the parameter table on the display panel 44.

When the date/time has not expired (S350: NO) or when no character string corresponding to the character string "Expires" are registered with the parameter table (S340: NO), the CPU 12 examines whether a character string corresponding to the character string "Last-Modified" is registered in the parameter table generated in S320 (S370).

When a character string corresponding to the character string "Last-Modified" is registered with the parameter table (S370: YES), the CPU 12 examines whether a character string corresponding to the character string "ORG" is registered with the parameter table (S380).

When the character string corresponding to the character string "ORG" is registered with the parameter table (S380: YES), the date/time of a web page, which is indicated by the URL represented by the character string registered with the parameter table (S390). In this step, as in S110 shown in FIG. 2, the transmission of data for accessing the web page is executed with the server, and the CPU 12 obtains the contents of the Last-Modified header field included in the data (HTTP header) transmitted from the server. Then, the CPU 12 regards the contents of the Last-Modified header field as the modified date/time of the web page.

When the CPU 12 recognizes the modified date/time of the web page (S390: YES), the CPU 12 checks whether the modified date/time represented by the character string corresponding to the character string "Last-Modified" checked in S370 and the modified date/time recognized in S390 coincide with each other (S400).

When the modified dates/times do not coincide with each other, or when the modified date/time cannot be recognized in S390 (S400: NO), the CPU 12 notifies that the modified dates/times do not coincide (S410), and finishes the web scan procedure. In S410, the CPU 12 displays a message indicating that the modified dates/times do not coincide on the display panel 44.

When both of the modified dates/times coincide with each other (S400: YES), when no character string corresponding to the character string "Last-Modified" is not registered (S370: NO) or when no character string corresponding to the character string "ORG" is not registered (S380: NO), input data is generated based on the input table generated in S330 (S420). In S420, the names and contents of the variables registered with the input table are connected and then encoded in accordance with a predetermined protocol to generate a character string as the input data. According to the embodiment, the name, sexuality, address and type are connected and encoded to generate input data: "name=EEEE FFFF&sex=m&address=123 GGG HHH III Japan&type=1".

The input data generated in S420 is transmitted (S430). In S430, the input data is transmitted to a URL corresponding to the string character "URL" registered with the parameter table generated in S320, in accordance with a method identified by a character string corresponding to a character string "method".

Specifically, when the character string corresponding to the character string "method" is a string "get", the input data is transmitted to the URL represented by the character string corresponding to the character string "URL" by requesting the web page having the URL indicated by a character string corresponding to the character string "URL" using the URL which includes the character string corresponding to the character string "URL" followed by a character "&" for connecting character strings, and the input data generated in S420. When the character string corresponding to the character string "method" is "post", the input data is transmitted to the URL represented by the character string corresponding to the character string "URL" by adding the input data generated in S420 to the data that is transmitted to request for the web page.

After step S430 is finished, the CPU 12 finishes the web scan procedure.

Figure 2:
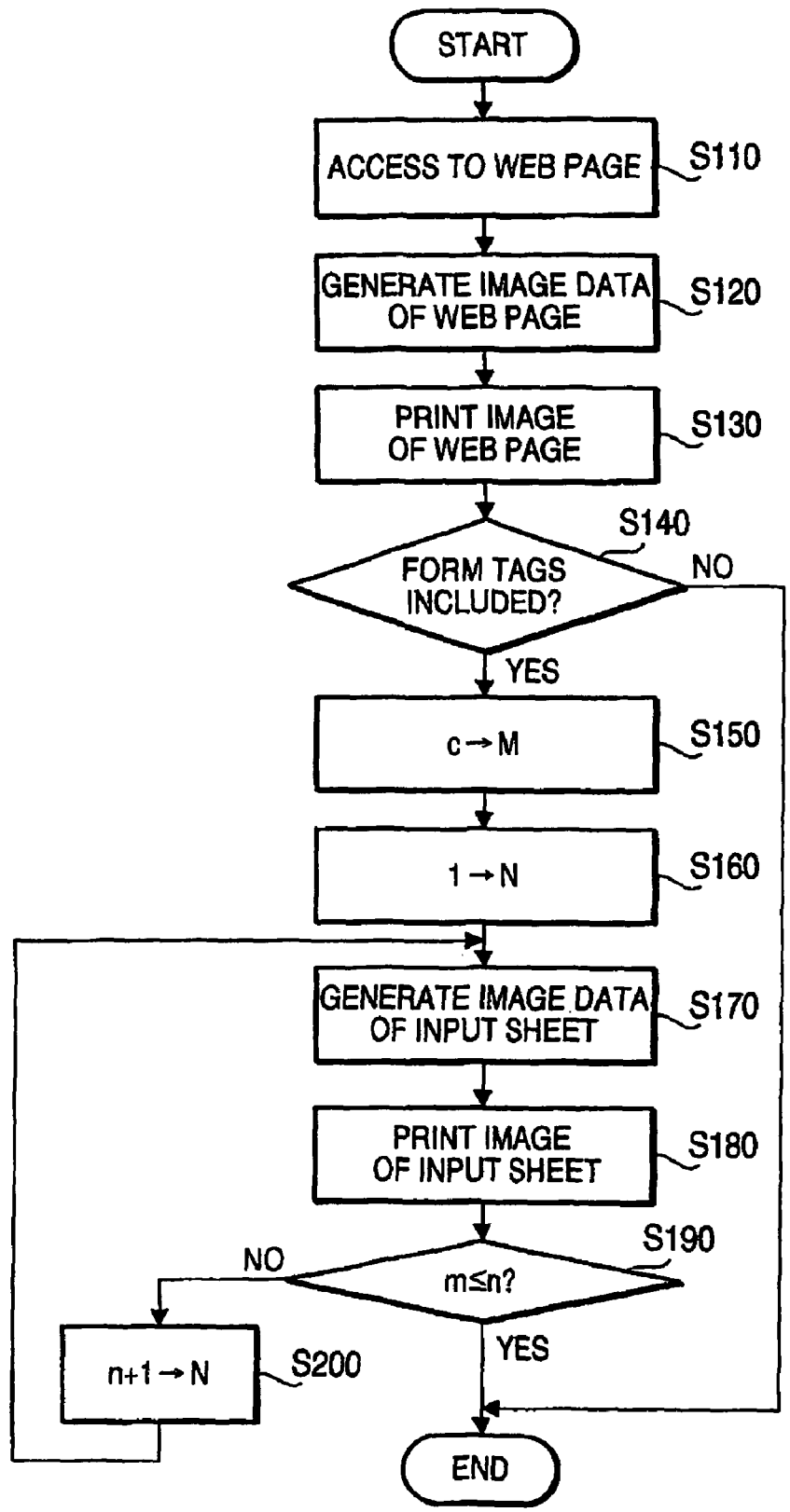
FIG. 2 is a flowchart illustrating a web print procedure according to a first embodiment of the invention.

According to the MFP 1 configured as above, an image of the input area A3 in which the user is required to input data, and the parameter area A2 in which the parameters necessary for transmitting the input data, which are included in the web page accessed in S110 of FIG. 2, is generated and printed on a recording sheet in S170 and S180.

Then, the user writes contents, which are to be input to the input box of the web page, in the input area A3 and the parameter area A2, and operates the MFP 1 to read the same. The MFP 1 scans the image of the sheet in S310 of FIG. 5, and recognizes the written contents in the input area A3 and the parameter area A2 in S320 and S330. Then, based on the contents extracted from the input area A3, the input data is reproduced in S420. Further, based on the contents extracted from the parameter area A2, the transmission destination (a character string corresponding to the URL) is reproduced, and to the destination, the contents reproduced in S420 is transmitted (S430).

As above, when a web page having an input box and input data is transmitted to a predetermined destination is printed, using the web print function, on a recording sheet, an inputting operation and a transmission operation of the input data can be realized.

The data necessary for the input operation in the input box and the transmission operation of the input data can be obtained from the sheet as printed in S180. Therefore, the MFP 1 need not be provided with a storage area.

Further, the image of the input sheet printed out in S180 can be printed out on a different sheet on which the image of the web page is printed out in S130. Therefore, the image of the web page can be printed as it looks. Therefore, without changing a layout of the objects in the web page can, be remained. That is, the input operation of the input data in the input box, and the transmission operation of the input data can be realized without changing the layout of the objects in the web page.

Further, on the sheet on which the image of the input box is printed in S180, the image of the web page is not printed. Thus, in this case, when the respective areas are identified in S320 and S330, it is not necessary that the CPU 12 distinguishes the input areas and the objects of the web page. Accordingly, load to the CPU 12, which performs the OCR, is suppressed.

When the current date/time is later than the date/time represented by the character string corresponding to the character string "Expires", control proceeds to S360 and the input data is not transmitted in S430. It should be noted that the character string corresponding to the character string "Expires" represents the date/time when the contents provided by the web page are modified (i.e., the effective date/time of the web page). After the expiration of the date/time, the contents of the web page may be modified (e.g., the data to be input in the input boxes and/or the destination where the input data is to be transmitted may be modified). Therefore, in the embodiment, when the current date/time has passed the date/time represented by the character string corresponding to the character string "Expires", the input data is not transmitted. With this configuration, transmission of the wrong data, transmission of the data to a wrong destination and/or outputting unnecessary data into the Internet 200 can be prevented effectively.

Further, when the current date/time is later than the date/time represented by the character string corresponding to the character string "Expires", a message is notified to the user in S360. Thus, the user can know the expiration of the effective date.

Further, when the date/time of the web page recognized in S390 is different from the date/time represented by the character string corresponding to the character string "Last-Modified", control proceeds to S410, and the input data is not transmitted in S430.

It should be noted that the character string corresponding to the character string "Last-Modified" represents the date/time when the web page is accessed (i.e., modified) in S110 of FIG. 2. In other words, the character string corresponding to the character string "Last-Modified" represents the date/time when the input sheet was printed. Further, the modified date/time obtained in S390 represents the modified date/time of the web page when the input sheet of which the input area A3 was filled in by the user was scanned. Therefore, there may be a time-lag between the printout of the input sheet and the scanning of the input sheet. In such a case, it may be possible that the web page is modified after the printout of the input sheet and before the scanning of the input sheet filled in by the user. That is, the data to be input and/or the destination to which the input data is to be transmitted may be changed during the time-lag.

Therefore, according to the embodiment, when both of the dates/times coincide, the input data is not transmitted. When both the dates/times are different, the user is notified in S410.

When the web page accessed in S110 includes a plurality of groups of input boxes, each group having a plurality of input boxes and all the data input in the input boxes of the same group being to be transmitted to the same destination, the CPU 12 may print out different input sheets for respective groups in S180.

When the input sheets are output as above, each input sheet can be treated as the input sheet for a web page which does not have such a plurality of groups of input boxes.

The present invention is not limited to the configuration of the exemplary embodiment described above, and can be modified in various ways without departing from the scope of the invention.

For example, in the embodiment described above, the configuration of the communication terminal according to the invention is employed in the MFP 1. The device need not be limited to the MFP 1 described above, and the configuration of the communication terminal can be employed in any other suitable devices having the web print function.

In the above embodiment, a communication system includes a single MFP 1. However, the communication system according to the invention may include a plurality of devices including one or more MFP 1 and/or one or more terminal devices.

In the exemplary embodiment, the MFP 1 is configured to printout/scan an image on a recording sheet. The invention is not limited to this configuration, and the MFP 1 may be configured to printout/scan the image on recording medium other than the recording sheet.

In the exemplary embodiment, the procedures shown in FIGS. 2 and 5 are executed by the CPU 12. The invention need not be limited to this configuration. For example, each procedure may be executed by another computer system which is connected to the MFP 1 through a wired/wireless signal transmission line.

In the above-described exemplary embodiment, the procedures shown in FIGS. 2 and 5 are executed in accordance with programs stored in the ROM 14 of the MFP 1. However, the invention is not limited to such a configuration. If the MFP 1 is configured to read/write data from/to a recording medium such as an FD (Floppy Disk®) or a memory card, the procedures shown in FIGS. 2 and 5 may be executed in accordance with the programs stored in such a recording medium.

In the exemplary embodiment, the MFP 1 is connected to a WAN (Wide Area Network) including the Internet. However, the invention is not limited to the configuration, and the MFP 1 may be connected with a LAN (Local Area Network).

In the exemplary embodiment, each data table (i.e., the parameter table and the input table: see FIG. 6) is stored in the RAM 16. However, the invention is not limited to such a configuration. If the MFP 1 is capable of write/read data to/from a recording medium (e.g., a hard disk or a memory card) other than the RAM 16, the data tables may be stored in such a recording medium.

In the embodiment, when the web page accessed in S110 includes a plurality of groups of input boxes, each group having a plurality of input boxes and all the data input in the input boxes of the same group being to be transmitted to the same destination, the CPU 12 may print out different input sheets for respective groups in S180. The invention is not limited to such a configuration.

The embodiment may be modified such that a plurality of areas corresponding to a plurality of groups may be printed on the same sheet.

As shown in FIG. 7, in S170M, image data of the input sheet corresponding to an n-th form tag is generated. Then in S190M, m and n is compared as in S190 of FIG. 2. In S180M, image data connecting first to m-th image data is printed on the same sheet. When the connected data cannot be printed on one sheet, it is printed over a plurality of sheets.

Figure 8:
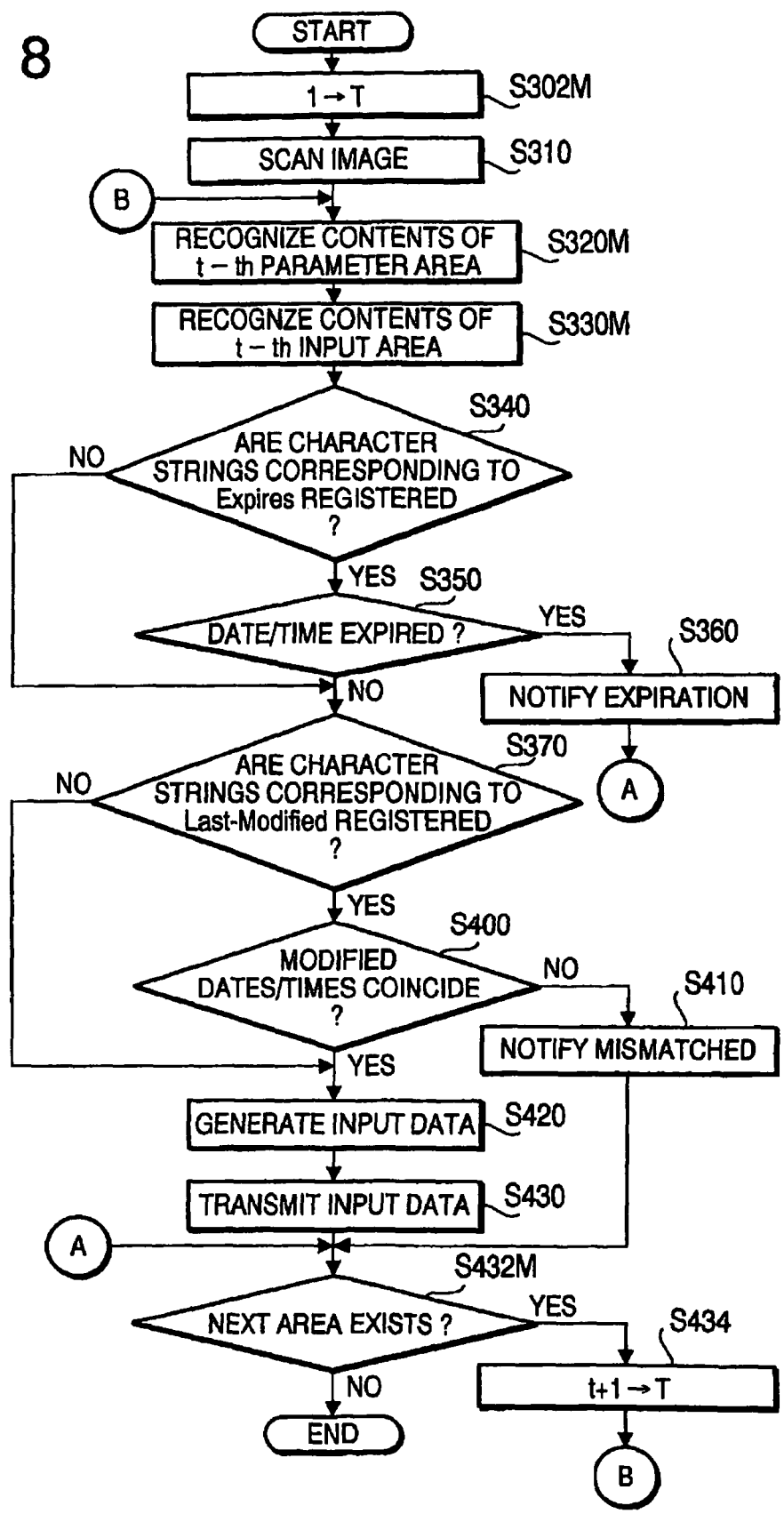
FIG. 8 is a flowchart illustrating a web scan procedure according to a second embodiment.

As shown in FIG. 8, which corresponds to the procedure shown in FIG. 1, S302M is added before S310 to initialize a variable T (i.e., T is set to 1: hereinafter, a value of the variable T is represented by "t"). In S320M and S330M, contents of the parameter areas and input areas corresponding to the number area A1 representing t are recognized.

After steps S360, S410 or S430 is finished, when there is a (t+1)-th area exists (S432M: YES), the variable T is incremented by one (i.e., T is set to 1+t) in S434M, and control proceeds to S310. When the (t+1)-th area does not exist (S432M: NO), the web scan procedure is finished.

The image data generated in S170 of FIG. 2 may be modified such that the text area A31 of the input area A3 is divided into a plurality of segments as shown in FIG. 9, each segment for one character. With this configuration, the user can use the segments as a guide when a character string is written. Further, the MFP 1 can easily identify respective characters when the characters are recognized in S330 of FIG. 5.

The present disclosure relates to the subject matter contained in Japanese Patent Application No. 2003-12703, filed on Jan. 21, 2003, which is expressly incorporated herein by reference in its entirety.

What is claimed is:

1. A communication system, comprising:
    a printing unit that is controlled to print an image on a recording medium;
    a scanning unit that is controlled to scan an image;
    an accessing system that connects with a web page though a network in response to an operation of a user;
    a first print controller that controls said printing unit to print the web page accessed by said accessing system on a first recording medium;
    a determination unit that determines whether the web page accessed using said accessing system includes an input field in which data is to be input by the user and the data input in the input field is to be transmitted to a predetermined destination;
    a second print controller that operates such that, when the determination unit determines that the web page accessed using said accessing system includes the input field in which the data is to be input by the user and the data input in the input field being to be transmitted to the predetermined destination, said second print controller controls said printing unit to automatically print an image having at least a fill-in area corresponding to the input field, the fill-in area being to be filled in by the user, and a destination area indicating the destination defined by the web page on a second recording medium;
    a scan controller that controls said scanning unit to scan the second recording medium having the at least fill-in area filled in by the user to capture an image thereof;
    a recognition system that recognizes contents written in the fill-in area and the destination area based on the image of the second recording medium scanned by said scanning unit under control of said scan controller; and
    a data transmitting system that transmits contents written in the fill-in area and recognized by said recognition system to the destination printed in the destination area and recognized by said recognition system,
    wherein the image printed on the second recording medium only contains a portion of the whole web page.

2. The communication system according to claim 1,
    wherein said second print controller is configured to examine whether the web page accessed with said accessing system includes term data representing an effective term of the web page, said second print controller controls said printing unit to print an image having a term area related to the term data as well as the fill-in area and the destination area on the second recording medium,
    wherein said recognition system is configured to recognize contents printed in the fill-in area, the destination area and the term area of the image scanned by said scanning unit,
    wherein said communication system further comprises a term examining system that determines whether a current date/time is later than a term that is printed in the term area of the second recording medium and recognized by said recognition system, and
    wherein said data transmitting system is configured to transmits the contents written in the fill-in area to the destination indicated by the contents in the destination area only when said term examining system determines that the current date/time is on or before the term extracted from the term area of the second recording medium.

3. The communication system according to claim 2, further comprising a notifying system that notifies a user of said communication system that the current date/time is later than the effective term of the web page when said term examining system determines that the current date/time is later than the term extracted from the term area of the second recording medium.

4. The communication system according to claim 1,
    wherein said second print controller is configured to examine whether the web page accessed with said accessing system includes a modified time data representative of a date/time when the contents of the web page were lastly modified, said second print controller controls said printing unit to print an image having a last-modified time area representing the last modified date/time of the web page and an access data area having access data that was referred to when said accessing system accessed the web page as well as the fill-in area and the destination area on the second recording medium, wherein said recognition system is configured to recognize contents printed in the fill-in area, the destination area, the last-modified time area and the access data area of the image scanned by said scanning unit, wherein said communication system further comprises:

a modified date/time obtaining system that obtains the last-modified date/time from the web page with reference to the data in the access data area; and a modified date/time examining system that examines whether the last-modified date/time obtained by said modified date/time obtaining system coincides with a date/time that is printed in the last-modified date/time area and recognized by said recognition system, wherein said data transmitting system is configured to transmits the contents written in the fill-in area to the destination indicated by the contents in the destination area only when said modified date/time examining system determines that the last-modified date/time obtained by said modified date/time obtaining system coincides with a date/time printed in the last-modified date/time area and recognized by said recognition system.

5. The communication system according to claim 4, further comprising a notifying system that notifies a user of said communication system that the last-modified date/time obtained by said modified date/time obtaining system does not coincide with a date/time that is extracted from the last-modified date/time area of the second recording medium when said modified date/time examining system determines that the last-modified date/time obtained by said modified date/time obtaining system does not coincide with a date/time printed in the last-modified date/time area of the second recording medium and recognized by said recognition system.

6. The communication system according to claim 1, wherein, when the web page accessed with said accessing system includes a plurality of groups of input fields, the input fields falling within a same group having a same destination, the input fields falling within different groups having different destinations, said second print controller controls said printing unit to print an image having at least the fill-in area and the destination area on different second recording mediums for different groups of input fields.

7. The communication system according to claim 1, wherein, when the web page accessed with said accessing system includes a plurality of groups of input fields, the input fields falling within a same group having a same destination, the input fields falling within different groups having different destinations, said second print controller controls said printing unit to print an image having at least the fill-in area and the destination area on the same second recording medium regardless whether the plurality of input fields fall within the different groups.

8. The communication system according to claim 1, wherein the second print controller generates a print form or an image data of an input sheet to be printed based on the web page which is determined, by the determination unit, to include the input field.

9. A communication terminal, comprising:

a printing unit that is controlled to print an image on a recording medium;

an accessing system that connects with a web page though a network in response to an operation of a user;

a first print controller that controls said printing unit to print the web page accessed by said accessing system on a first recording medium;

a determination unit that determines whether the web page accessed using said accessing system includes an input field in which data is to be input by the user and the data input in the input field is to be transmitted to a predetermined destination;

a second print controller that operates such that, when the determination unit determines that the web page accessed using said accessing system includes the input field in which the data is to be input by the user and the data input in the input field being to be transmitted to the predetermined destination, said second print controller controls said printing unit to automatically print an image having at least a fill-in area corresponding to the input field, the fill-in area being to be filled in by the user, and a destination area indicating the destination defined by the web page on a second recording medium;

a scanning unit that is controlled to scan an image;

a scan controller that controls said scanning unit to scan the second recording medium having the at least fill-in area filled in by the user to capture an image thereof;

a recognition system that recognizes contents written in the fill-in area and the destination area based on the image of the second recording medium scanned by said scanning unit under control of said scan controller; and a data transmitting system that transmits contents written in the fill-in area and recognized by said recognition system to the destination printed in the destination area and recognized by said recognition system, wherein the image printed on the second recording medium only contains a portion of the whole web page.

10. The communication terminal according to claim 9, wherein said second print controller is configured to examine whether the web page accessed with said accessing system includes term data representing an effective term of the web page, said second print controller controls said printing unit to print an image having a term area related to the term data as well as the fill-in area and the destination area on the second recording medium, wherein said recognition system is configured to recognize contents printed in the fill-in area, the destination area and the term area of the image scanned by said scanning unit, wherein said communication terminal further comprises a term examining system that determines whether a current date/time is later than a term that is printed in the term area of the second recording medium and recognized by said recognition system, and wherein said data transmitting system is configured to transmits the contents written in the fill-in area to the destination indicated by the contents in the destination area only when said term examining system determines that the current date/time is on or before the term extracted from the term area of the second recording medium.

11. The communication terminal according to claim 10, further comprising a notifying system that notifies a user of said communication terminal that the current date/time is later than the effective term of the web page when said term examining system determines that the current date/time is later than the term extracted from the term area of the second recording medium.

12. The communication terminal according to claim 9,
wherein said second print controller is configured to examine whether the web page accessed with said accessing system includes a modified time data representative of a date/time when the contents of the web page were lastly modified, said second print controller controls said printing unit to print an image having a last-modified time area representing the last modified date/time of the web page and an access data area having access data that was referred to when said accessing system accessed the web page as well as the fill-in area and the destination area on the second recording medium,
wherein said recognition system is configured to recognize contents printed in the fill-in area, the destination area, the last-modified time area and the access data area of the image scanned by said scanning unit,
wherein said communication terminal further comprises:
a modified date/time obtaining system that obtains the last-modified date/time from the web page with reference to the data in the access data area; and
a modified date/time examining system that examines whether the last-modified date/time obtained by said modified date/time obtaining system coincides with a date/time that is printed in the last-modified date/time area and recognized by said recognition system,
wherein said data transmitting system is configured to transmits the contents written in the fill-in area to the destination indicated by the contents in the destination area only when said modified date/time examining system determines that the last-modified date/time obtained by said modified date/time obtaining system coincides with a date/time printed in the last-modified date/time area and recognized by said recognition system.

13. The communication terminal according to claim 12, further comprising a notifying system that notifies a user of said communication terminal that the last-modified date/time obtained by said modified date/time obtaining system does not coincide with a date/time that is extracted from the last-modified date/time area of the second recording medium when said modified date/time examining system determines that the last-modified date/time obtained by said modified date/time obtaining system does not coincide with a date/time printed in the last-modified date/time area of the second recording medium and recognized by said recognition system.

14. The communication terminal according to claim 9, wherein, when the web page accessed with said accessing system includes a plurality of groups of input fields, the input fields falling within a same group having a same destination, the input fields falling within different groups having different destinations, said second print controller controls said printing unit to print an image having at least the fill-in area and the destination area on different second recording mediums for different groups of input fields.

15. The communication terminal according to claim 9, wherein, when the web page accessed with said accessing system includes a plurality of groups of input fields, the input fields falling within a same group having a same destination, the input fields falling within different groups having different destinations, said second print controller controls said printing unit to print an image having at least the fill-in area and the destination area on the same second recording medium regardless whether the plurality of input fields fall within the different groups.

16. The communication terminal according to claim 9,
wherein the second print controller generates a print form or an image data of an input sheet to be printed based on the web page which is determined, by the determination unit, to include the input field.

17. A non-transitory computer-readable storage medium that stores a computer-executable program for communicating using a web page, the program comprising:
instructions for accessing a web page though a network in response to an operation of a user;
instructions for printing the web page as accessed on a first recording medium;
instructions for determining whether the web page accessed using said accessing system includes an input field to be input by the user and data input in the input field is to be transmitted to a predetermined destination;
instructions for automatically printing an image having at least a fill-in area to be filled in by the user and a destination area indicating the destination to which the data corresponding to the fill-in area is to be transmitted on a second recording medium when it is determined that the web page includes the input field in which the data is to be input by the user and the data input in the input field being to be transmitted to a predetermined destination, the fill-in area corresponding to the input field, the predetermined destination being represented in the destination area;
instructions for scanning the second recording medium having the at least fill-in area filled in by the user to capture an image thereof;
instructions for recognizing contents written in the fill-in area and the predetermined destination indicated in the destination area based on the image of the second recording medium; and
instructions for transmitting contents written in the fill-in area and recognized in the step of recognizing to the predetermined destination recognized in the step of recognizing,
wherein the image printed on the second recording medium only contains a portion of the whole web page.

18. The non-transitory computer-readable storage medium according to claim 17, the program further comprising:
instructions for generating a print form or an image data of an input sheet to be printed based on the web page which is determined to include the input field.

19. A method of communicating using a web page, comprising the steps of:
accessing a web page though a network in response to an operation of a user; printing the web page as accessed on a first recording medium;
determining whether the web page includes an input field in which data is to be input by the user and the data input in the input field is to be transmitted to a predetermined destination;
printing an image having at least a fill-in area to be filled in by the user and a destination area indicating a destination to which data corresponding to the fill-in area is to be transmitted on a second recording medium when it is determined that the web page includes an input field in which data is to be input by the user and the data input in the input field being to be transmitted to a predetermined destination, the fill-in area corresponding to the input field, the predetermined destination being represented in the destination area, the printing being performed automatically;

a scanning the second recording medium having the at least fill-in area filled in by the user to capture an image thereof;
a recognizing contents written in the fill-in area and the predetermined destination indicated in the destination area based on the image of the second recording medium; and
transmitting contents written in the fill-in area and recognized in the step of recognizing to the predetermined destination recognized in the step of recognizing,
wherein the image printed on the second recording medium only contains a portion of the whole web page.

20. The method of communicating using a web page according to claim 19, further comprising the step of:
generating a print form or an image data of an input sheet to be printed based on the web page which is determined to include the input field.

* * * * *